United States Patent [19]

Haas

[11] Patent Number: 4,925,716

[45] Date of Patent: May 15, 1990

[54] PIN FEED BADGE

[75] Inventor: David J. Haas, 9 Margret Ann La., Suffern, N.Y. 10901

[73] Assignee:

[21] Appl. No.: 296,228

[22] Filed: Jan. 12, 1989

[51] Int. Cl.[5] .......................... B32B 7/06; B32B 7/12; B32B 3/10

[52] U.S. Cl. .......................................... 428/41; 428/43; 428/136; 428/137; 40/1.5

[58] Field of Search .................................... 428/40–43, 428/136, 137; 282/12 A, 11.5 R, 11.5 A; 40/1.5; 206/820, 813

[56] References Cited

U.S. PATENT DOCUMENTS

| | | | |
|---|---|---|---|
| 3,697,101 | 10/1972 | Loos et al. | 283/62 |
| 4,361,230 | 11/1982 | Downing et al. | 206/820 |
| 4,454,180 | 6/1984 | Lamers | 3/16 |
| 4,547,252 | 10/1985 | Lamers | 9/18 |
| 4,648,930 | 3/1987 | Lamers | 9/18 |

*Primary Examiner*—Alexander S. Thomas

*Attorney, Agent, or Firm*—Weingram & Zall

[57] ABSTRACT

Computerized processing of identification badges employing a base carrier portion in the form of a web carrier. The web carrier has perforated end portions formed integrally therewith so that the sprockets of automated computerized printing equipment can be used to engage the carrier web. The carrier web also is formed into sections via a lateral perforation so that each section is removable, one from the other. The badges are each adhesively mounted on individual ones of the sections. The adhesive employed is preferably a fugitive glue which holds the badge onto the carrier web while permitting the badge to "peel" away from the carrier web without any adhesive remaining on the badge. The badge employed is relatively stiff, being formed of plastic material, and has an elongated slot formed on the upper central portion thereof so that the badge can be affixed to the person via a spring clip. A portion of the clip passes through the elongated slot to support the badge.

3 Claims, 1 Drawing Sheet

PIN FEED BADGE

BACKGROUND OF THE INVENTION

1. Field of the Invention

This invention relates to badges for identification and security and specifically to polymeric or plastic badges which can be easily manufactured, printed, written upon and distributed using computerized equipment so as to provide the capability of customizing printing, color, content and speed of delivery at low costs.

2. Description of the Prior Art

U.S. Pat. Nos. 4,454,180; 4,547,252; and 4,648,930 to La Mers disclose a labelling system employing an elongated label strip used with motor driven sprocket rollers for sequentially delivering labels to a mechanism operable to apply each label to an object. These patents describe a carrier web consisting of a series of labels with viscous pressure sensitive adhesive applied to a carrier strip of paper which has been coated on the label side with a release agent. The labels are removed by moving them sequentially by pulling the carrier strip around a relatively sharp edge under tension. The label, because of its stiffness, releases from the carrier web and continues in a straight line over the edge rather than bend sharply and follow the carrier web. The labels shown in the La Mers patents are mounted on a carrier which employs a center line cut therein to facilitate the rapid and accurate removal of labels.

SUMMARY OF THE INVENTION

This invention employs a base carrier portion in the form of a web carrier. The web carrier has perforated end portions formed integrally therewith so that the sprockets of automated computerized printing equipment can be used to engage the carrier web. The carrier web also is formed into sections via a lateral perforation so that each section is removable one from the other. The badges, preferably of plastic, are each adhesively mounted on the individual sections. The adhesive employed is preferably a fugitive glue, i.e., an adhesive such as natural latex or a fugitive adhesive from H. B. Fuller, Co. such as # W-593 which holds the badge onto the carrier web while permitting the badge to "peel" away from the carrier web without any adhesive remaining on the badge.

The badge employed is relatively stiff, being formed of plastic material, has a portion of the surface roughened to permit writing thereon, and has an elongated slot formed on the upper central portion thereof so that the badge can be affixed to the person via a spring clip. A portion of the clip passes through the elongated slot to support the badge.

A principal object of this invention is the provision of an identification badge system, the preparation of which can be easily automated using computer equipment to rapidly imprint badges with computer stored information and to enable the badges to be handled in the same manner as continuous fan fold computer paper.

Another object of this invention is the provision of an identification badge or card which can be generated at the location where the same will be used, such as at a trade show.

A further object of the invention is the provision of a supported carrier for the badges where a fugitive glue is used to adhere the badge to the carrier.

Another object of the invention is the provision of a supporting carrier for identification badges wherein each badge is mounted on a tear away section of the carrier.

A still further object of the invention is the provision of an identification badge which is affixed to the wearer without the use of any adhesive.

BRIEF DESCRIPTION OF THE DRAWINGS

These as well as further objects and advantages of the invention will become apparent to those skilled in the art from a review of the following detailed specification of my invention, reference being made to the accompanying drawing in which.

DETAILED DESCRIPTION OF THE INVENTION

Figure 1:
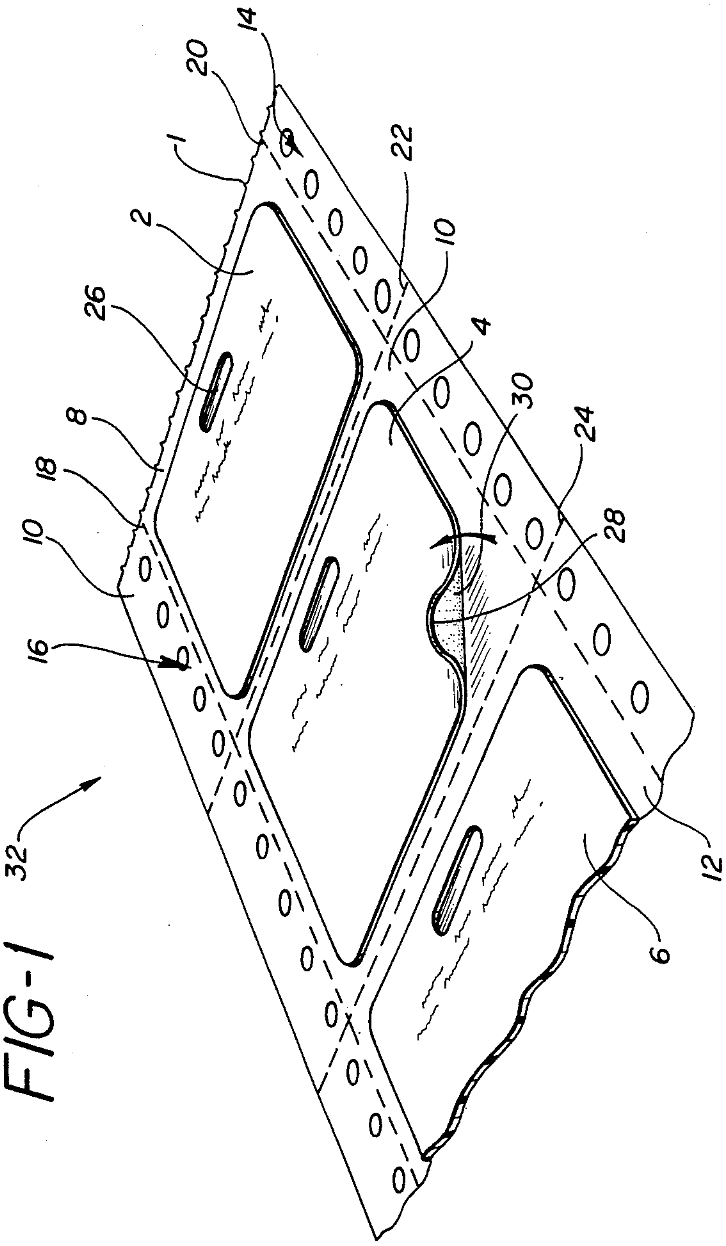
FIG. 1 is a perspective view of the apparatus of the invention.

As shown in FIG. 1, the main part of the apparatus 32 includes sectioned carrier web having separable sections 8, 10, and 12. Badge cards 2, 4, and 6 are adhesively affixed to each web section. The web sections are perforated for separation at perforation lines 22 and 24. Each side of the web carrier has an elongated apertured portion 14 and 16, respectively engaged continuously to each section via perforation lines 18 and 20.

Each badge card has an elongated aperture 26 formed therein for supporting the card with a clip. The badge card may also have a plurality of holes therein for supporting the card to the wearer with a pin. Each badge card such as card 4 in FIG. 1 is peelable from the carrier web. Preferably the badge card is made of a polymer, e.g. a stiff plastic, has a portion of the surface roughened thereon for writing upon and is sufficiently flexible for pinfeeding. The badges 4 are each adhesively mounted on the individual sections 8,10,12. The adhesive employed 30 is preferably a fugitive glue, i.e., an adhesive such as natural latex or a fugitive adhesive from H. B. Fuller Co. such as No. W-593 which holds the badge 4 onto the carrier web while permitting the badge 4 to "peel" away from the carrier web without any adhesive remaining on the badge. Numeral 28 illustrates the card 4 being peeled at edge 28 for the section 10 of the carrier web.

As modifications to the foregoing may be made without departing from the spirit and scope of my invention, what is desired to be obtained in this United States Letters Patent is set forth in the accompanying claims.

I claim:

1. An apparatus for computerized processing of identification badges for affixing to a wearer comprising:

badge carrier means having a plurality of sections, the sections coupled to each other via perforated connections, each of the sections being separable, one from the other, and each section comprising a central portion and removable apertured end portions for cooperating with carrier processing means for receiving sprockets in automated sheet feeding equipment; and each central portion including a polymeric badge adhesively and removably mounted thereto, the badge having thereon a roughened writing surface and a means for affixing the badge to a wearer.

2. The apparatus of claim 1, wherein the means for affixing the badge to a wearer includes an elongated slot formed therein for receiving a clip for affixing the badge to the wearer.

3. The apparatus of claim 1, wherein the means for affixing the badge to a wearer includes a plurality of holes formed therein for receiving a pin for affixing the badge to the wearer.

* * * * *